United States Patent [19]

Nelson et al.

[11] Patent Number: 5,271,851
[45] Date of Patent: Dec. 21, 1993

[54] INTEGRATED TREATMENT SYSTEM FOR REFINERY OILY SLUDGES

[75] Inventors: Stephen R. Nelson; Alan M. Claude, both of Edmond, Okla.

[73] Assignee: Kerr-McGee Corporation, Oklahoma City, Okla.

[21] Appl. No.: 27,879

[22] Filed: Mar. 8, 1993

[51] Int. Cl.$^5$ ............................................. B01D 29/01
[52] U.S. Cl. .................................. 210/770; 210/778; 210/193; 210/328
[58] Field of Search ................ 210/359, 767, 768–771, 210/777, 778, 780, 791, 314, 295, 297, 322, 323.1, 324, 328, 193

[56] References Cited

U.S. PATENT DOCUMENTS

| | | |
|---|---|---|
| 1,857,810 | 5/1932 | Gee . |
| 2,101,012 | 11/1937 | Pond . |
| 2,430,182 | 11/1947 | McGuire et al. . |
| 2,696,306 | 12/1954 | Gomory . |
| 2,971,658 | 2/1961 | Lane et al. . |
| 3,433,816 | 3/1969 | Muller et al. . |
| 3,574,329 | 4/1971 | Beavon . |
| 3,645,398 | 2/1972 | Fiocco . |
| 3,835,021 | 9/1974 | Lorenz et al. . |
| 3,842,001 | 10/1974 | Keller . |
| 3,859,213 | 1/1975 | Hunt . |
| 3,925,202 | 12/1975 | Hirs . |
| 3,966,611 | 6/1976 | Gibbs et al. . |
| 4,050,390 | 9/1977 | Hara et al. . |
| 4,160,732 | 7/1979 | Maffet . |
| 4,208,288 | 6/1980 | Stannard et al. . |
| 4,260,489 | 4/1981 | Greig et al. . |
| 4,309,292 | 1/1982 | Stannard et al. . |
| 4,310,422 | 1/1982 | Romey et al. . |
| 4,632,764 | 12/1986 | Riise . |
| 4,675,107 | 6/1987 | Chamberlain . |
| 4,687,584 | 8/1987 | Urbani . |
| 4,707,275 | 11/1987 | Filho et al. . |
| 4,740,316 | 4/1988 | Sweeney . |
| 4,774,002 | 9/1988 | Gutman et al. . |
| 4,774,007 | 9/1988 | Gordon . |
| 4,781,825 | 11/1988 | Grimes et al. . |
| 4,839,022 | 6/1989 | Skinner . |
| 4,840,736 | 6/1989 | Sander et al. . |

(List continued on next page.)

FOREIGN PATENT DOCUMENTS 1340931 12/1973 United Kingdom .
1535516 12/1978 United Kingdom .
2128098 4/1984 United Kingdom .

OTHER PUBLICATIONS

Jones, G. R., Oakes, G. R., and Scott, W. H. *The B.E.S.T.® Solvent Extraction System; A Universal Treatment Choice for Refinery Waste*, paper delivered at The Petro-Safe '91 Conference, 1991 (11 pp.).

Fliippi and Markiewica, *Propane Extraction Treats Re-*

(List continued on next page.)

Primary Examiner—Frank Sever
Attorney, Agent, or Firm—Herbert M. Hanegan

[57] ABSTRACT

A process for the treatment of refinery oily sludges to produce an oily fraction that is reprocessed in the refinery into (i) salable products and (ii) a solid residue meeting environmental regulatory agency requirements for disposal in non-hazardous solid waste landfills. The process includes mixing the refinery oily sludge with a particulate filter aid and preferably a single solvent selected from refinery intermediate and product streams and contacting this mixture with plate filters in a closed filter vessel. A cake residue forms on the filter plates and a filtrate mixture of oil, water and solvent is produced. The filtrate is separated into an oily fraction and a water fraction. The oily fraction is rerouted to refinery operating units for processing into salable products. The water fraction is routed to a refinery water treatment system. When filter cake residue has built to a predetermined level, charge to the filter vessel is discontinued. The filter cake residue is washed with a predetermined quantity of solvent and then steam stripped to remove petroleum hydrocarbons to a desired residual level, e.g. less than about 1,000 ppm or less than 500 ppm. The steam stripped filter cake is then removed from the filter vessel for disposal in an environmentally approved landfill.

16 Claims, 2 Drawing Sheets

U.S. PATENT DOCUMENTS 4,885,099  12/1989  Kelly .
4,954,267   9/1990  Uremovich .
4,994,332   2/1991  Coin et al. .
5,055,196  10/1991  Darian et al. .
5,066,386  11/1991  Paspek et al. .
5,087,363   2/1992  Kurowski .
5,089,143   2/1992  Anderson .
5,092,983   3/1992  Eppig et al. .
5,124,037   6/1992  Barloy .

OTHER PUBLICATIONS

*finery Wastes to BDAT Standards,* Sep. 1991 Oil & Gas Journal, pp. 52–54.
*Integrated Application of CF Systems' Technology to Refinery Operations,* CF Systems, literature of Morrison Knudsen Company (18 pp.).
*The Petroleum Refinery Land-Ban Solution,* CF Systems, Morrison Knudsen Company promotional materials (48 pp.).
Poche, Derby, and Wagner, *Solvent Extraction of Refinery Wastes Rates EPA BDAT,* Oil & Gas Journal, vol. 89, No. 1, pp. 73–77.
Ahnell, et al., *Environmental Challenges in Energy Utilization During the 1990s,* Proceedings of an APCA International Specialty Conference, 1988, pp. 298–315.
*Filter Model HRC: A different Concept in Filter Engineering,* 1988 Sparkler, Bulletin 2024 (4 pp.).
*BP Recycles Waste,* vol. 5, No. 8, "Environmental Protection Week," May 29, 1990, pp. 1–2.
Heathcoat, H. G., *Minimize Refinery Waste,* "Environmental Control".
*Hazardous Waste Cleanup,* The B.E.S.T. ® Solution from Resources Conservation Company (13 pp. including letters to Kerr McGee Corporation about B.E.S.T. ® process).

INTEGRATED TREATMENT SYSTEM FOR REFINERY OILY SLUDGES

BACKGROUND OF THE INVENTION

1. Field of the Invention

This invention relates to the treatment of refinery sludges in a closed integrated system utilizing refinery-generated solvents and recycling solvent and oil removed from the sludge back to the refinery for further processing leaving a residue of filtered solids which can be disposed of in a land fill.

2. Description of the Related Art

Refinery sludges are generated during refining operations at various stages in the process of refining crude petroleum oils to finished products. Refinery oily sludges containing entrained oil may be found for example in heat exchanger bundle cleaning solids, leaded or unleaded tank bottoms, slop oil emulsion solids and API separator sludge. These sludges have been defined by the U.S. Environmental Protection Agency (EPA) as Listed Hazardous Wastes. As such, these wastes must be disposed of as a hazardous waste unless firstly, they are treated to meet EPA land disposal treatment standards and, secondly, a petition to delist the particular waste is approved by the EPA. In the past, one acceptable method of disposal of such oil-entrained refinery solids has been incineration. However, incineration is an expensive process that does not recover the entrained oil for recycle to refineries. Thus treatment of refinery sludge for the recovery of oil and separation of solids has long been considered a desirable but yet unattainable alternative.

In particular, a process has long been sought to treat oily sludges to produce an oil portion that can be further treated to produce a saleable product and a solid portion that can be disposed of in a non-hazardous solid waste landfill. To allow such disposal, the solids must meet the EPA's Treatment Standards for Land Disposal, generally based on contaminant concentrations achieved by the Best Demonstrated Available Technology (BDAT), and Toxicity Characteristic Leach Procedure (TCLP) standards for disposal in a hazardous landfill site and must be delisted by the EPA. Upon delisting, the solids must then meet standards set by the particular State for disposal in non-hazardous solid waste landfills in their forum. This means of disposal, in a non-hazardous solid waste landfill as opposed to hazardous waste landfill, is the lowest cost method but has heretofore either not been achievable or has been achievable only with such high sludge processing cost as to be uneconomical.

U.S. Pat. No. 4,260,489 of Greil is directed to the treatment of oily sludge utilizing precoated surface filters such as plate, leaf and tube or candle filters preferably operated under pressure. In such filters, the precoat is effectively the filter medium and the function of the plate, leaf and tube or candle filter is to act as a support. The filter is precoated with diatomaceous earth. The sludge is slurried with water and then passed through the filter to produce a filter cake comprising mainly solid particles together with some oil and water. The filter cake is washed while on the filter with a light hydrocarbon solvent, kerosene or naphtha, to remove the oil and water. Subsequently, steam is applied to the filter cake to remove the solvent. However, the '489 patent teaches that the addition of water prior to filtration is an essential step. As will be explained below, the present invention finds this step deleterious and unnecessary. Additionally, the types of filters used in the '489 patent process all inevitably expose the workers and the surrounding environment to the filter cake and any volatile matter in the filter vessel during the process of removing the cake from the filter and disposing of the cake. In view of the potential for exposure to hazardous materials, it is desirable to operate such a treatment system in an entirely enclosed environment, if possible. United Kingdom Patent 1,535,516 discloses a treatment substantially similar to that of the '489 patent but once again all examples of the '56 UK patent teach that the sludge is slurried with water prior to filtration.

Solvent extraction for treatment of refinery sludge is also disclosed in the oil and Gas Journal article of Vol. 89, No. 1, pp. 73-77. In this oil and Gas Journal article, there is no mention of adding water to the sludge prior to filtration. The sludge is treated with propane as the sole solvent or with propane and then reformate to remove entrained oil. The Oil and Gas Journal article teaches the use of three separate vessel, one for mechanical treatment, one for solvent extraction and one for fixation of the sludge to reduce the leachability of metals in the extracted sludge by the addition of fixation agents such as pozzalonic reactions to immobilize metals and other constituents in the product residue and thereafter dewatering the mixture in a conventional filter press. The Oil and Gas Journal article further teaches that used solvents can be recycled back to the refinery and that facilitates may be added to recover and recycle the solvents within the extraction system. There is no teaching of the utilization of a filter process in which the filter vessel remains fully closed during the filtration process and that does not expose workers or the environment to the contents of the vessel.

U.S. Pat. No. 4,954,267 of Uremovich discloses a process for separating water and gasoline from the solids of a gasoline product tank sludge to produce a filtered, finished gasoline product. Filter aid and sludge are mixed in a mixer assembly and thereafter the mixed sludge and filter aid is pumped through one of a plurality of alternately selectable, sealed, horizontal plate filters. The filtered liquid is recirculated back through the mixing tank until a desired clarity is reached. The clear filtered liquid is then rerouted and pumped to an oil/water separator. The filtrate or cake collected on the filter plate is dried, preferably by introduction of an inert gas, and removed to a disposal site. The patent recommends the use of a Sparkler-brand filter provided with R-17 size nylon filter paper as its preferred filter. The process is operated on a batch basis and the filter plates must be removed and scraped clean between operations, thus exposing workers to potential hazards and exposing the environment to the contents of the filter vessel. The Uremovich patent does not disclose the use of a solvent nor does it disclose the use of steam to remove volatiles from the filter residue, rather, the Uremovich patent relies solely on a filter aid, such as diatomaceous earth, to enhance the filter process.

U.S. Pat. No. 5,092,983 is directed to a method for separating organic material from refinery sludges using solvent extraction techniques. In an optional pretreatment step, the refinery sludge is treated to remove some of the water and organic liquid (oil) from the sludge before treatment with the '983 patent's process. In one embodiment of the invention, most preferably at least about 90% by weight of the free water in the refinery sludge is removed during the pretreatment step. Further, in this pretreatment step, the refinery sludge may be mixed with a filter aid to facilitate the formation of and/or ensure the retention of a fluid-permeable mass or bed of solids. Thereafter, the sludge and a mixture of two different solvents are charged to an extraction unit where they mix to extract organic material from the refinery sludge. In a final stage, the refinery sludge solid residue from which organic material has been extracted is separated from solvents and organic material, preferably using a mechanical separation means such as filtration, centrifugation, hydrocycloning or settling. The process also includes an optional metal fixation process requiring the addition of commercially available silica or silicate-bearing solutions, fly ash, sodium sulfide, Pozzalime TM, and the like which is blended with the sludge solids at up to 100% by weight in order to fix the metals in the sludge in an insoluble form.

The '983 process specifies that two solvents are necessary. The first and second organic solvents used in the '983 patent's extraction process are described in very general terms. The first organic solvent can be any aromatic or aromatic-rich solvent that is readily available from a refinery system (such as reformate) or a middle distillate (such as fuel oil, straight run distillates, diesel oil, kerosene) and natural gas condensate. The second organic solvent, specified as different than the first organic solvent, must be of low viscosity and preferably aliphatic, aromatic or cycloaliphatic hydrocarbon having from about 2 to about 9 carbon atoms. The solvent can be a mixture of hydrocarbon compounds, or substantially hydrocarbon compounds having from 3 to about 5 carbon atoms. Liquified petroleum gas (LPG) is specified as a useful second organic solvent, as is commercial propane, butane, propane-butane mixture, special duty propane and propane HD-5, straight run gasoline, and any mixtures of the foregoing solvents.

The process of the U.S. Pat. No. 5,092,983 is limited to the use of solvent extraction with two specified solvents. The method requires a first solvent extraction stage that requires additional solvent extraction apparatus and uses two specific solvents followed by a subsequent stage that requires additional apparatus for separating solvents and extracted organic materials from solid residue. Further, there is no teaching or suggestion of how to perform the step of separating solids from liquids and routing the solids to disposal without exposing workers or the environment to the contents of the extraction and separation vessels. Finally, although it is represented that the solids may be disposed of using "conventional solids disposal techniques (e.g., landfill, etc.)," the process is only asserted to reduce the level of extractable organic material to a level of less than about 1% by weight, based on the weight of the solids. Such a high level of organic material residue in the solids may not meet Best Demonstrated Available Technology (BDAT) requirements and would not meet the Total Petroleum Hydrocarbon Limits (TPH) set by state regulatory agencies to allow the solids to be disposed of in non-hazardous solid waste landfills.

There are other known solvent extraction systems in industry. For example, the BEST 115R process by Resource Conservation Co. utilizes a reusable solvent, triethylamine, which is soluble in both oil and water in low temperatures but soluble only in oil at higher temperatures. In the BEST solvent extraction process, the sludge is fed into an extraction stage, cooled below 40° F. and extracted with triethylamine. The solids are then separated by filtration from the oil/water triethylamine mixture. The separated solids are dried, stripped of residual solvents to meet the EPA-required BDAT for disposal in a hazardous waste landfill. The oil/water/solvent mixture is heated above 130° F. so that the triethylamine becomes insoluble in water and enters the oil phase. The water is then decanted and stripped of any residual triethylamine before being discharged to the refinery waste and the oil is separated from the triethylamine so that the triethylamine can be recycled for use as solvent and the oil is presumably recovered and routed back to the refinery for further processing.

CF System treats oily sludge and utilizes propane as the feed solvent under conditions of agitation to extract oil from the solids in the waste/sludge. In a final step, hot water is used to displace and evaporate residual propane from the propane treated solids.

A horizontal plate-type filter is manufactured by Sparkler Filters, Inc. of Conroe, Texas. The Sparkler filter vessel includes a plurality of plates which may be horizontally disposed during normal filtering operation and then rotated through 90° to vertical positions for discharge of collected cake. The cake is discharged by gravity into the bottom of the filter vessel which contains a rotatable screw or scroll for moving the residue solids outwardly of the vessel. The complete cycle of operation of the filter vessel (filtration and cake discharge) is performed without opening the vessel. However, to the knowledge of the present inventors, this type of Sparkler filter has never been used in the oil refinery environment for any purpose.

What is yet needed is a process for the treatment of oily sludges that can be integrated into a typical oil refinery process scheme. Thus, the process should use solvents available in oil refineries that separates an oil fraction from the oily sludge that can be recycled for reprocessing in the oil refinery to produce a saleable product. Further, separated sludge solids should meet all the U.S. EPA and State requirements for disposal in a non-hazardous solid waste landfill to minimize disposal costs, or at least meet requirements for disposal in a hazardous waste landfill rather than requiring expensive incineration procedures. Finally, the process should desirably be carried out in an enclosed processing system using the minimum amount of vessels to minimize capital investment in equipment. The enclosed processing system should also avoid exposure of labor and the environment to any hazardous or potentially material that may be present in the oily sludge or solvents used in the process.

SUMMARY OF THE INVENTION

The invention provides a process for the treatment of refinery oily sludges that can be integrated into an oil refinery process scheme. The process uses solvents that are readily available either as refinery intermediate product streams from refinery operations or as final products. While more than one refinery-sourced solvent or a mixture of such solvents may be used, the process can, and preferably is, operated using a single solvent. The process produces an oily fraction that can be returned to the refinery for further processing to produce a useful product. Further, the invention process produces a separate solids product that meets the U.S. EPA's Treatment Standards for Land Disposal (TSLD) requirements so that it may be disposed of in a hazardous landfill thereby avoiding costly incineration. Further, this solid residue product meets the Toxicity Characteristic Leach Procedure (TCLP) requirement and typical state TPH (total petroleum hydrocarbon) specifications and may therefore, when it is delisted, be suitable for disposal in non-hazardous solid waste landfills, thereby allowing cost savings over disposal in hazardous waste landfills. The entire process is carried out in a closed system that uses a minimum number of vessels and equipment to reduce capital investment and that also avoids the exposure of labor and the environment to any hazardous material that may be present in the oily sludge or solvents used in the process.

In the invention process, refinery oily sludge, such as slop oil emulsion solids (SOES) containing water, particulate solids and oil, is directed to a mixing tank where it is intimately mixed with solvent to make the mixture more pumpable and a particulate filter aid, such as diatomaceous earth. Optionally, lime is also added at this point to fix heavy metals present in the sludge.

The process does not require as a preliminary step either the dewatering of the oily sludge or the addition of water to the oily sludge. Indeed, the addition of water should be avoided because it can reduce the effectiveness of the solvent used to extract hydrocarbons. However, the filter aid may optionally and preferably be wetted with a minimal amount of solvent, water, or both, depending on the composition of the sludge, before it is mixed with the oily sludge. While the solvent that is readily obtained from the refinery may be selected from any of those intermediate and product streams available at a refinery that are compatible with and able to dissolve the oily fraction of the sludge, naphtha or gasoline obtained from a fluidized catalytic cracking unit (FCCU), a hydrocracker or a reformer, are preferred. The mixture of filter aid/oily sludge/solvent is then charged to a filter vessel containing a plurality of plate filters. In general, the plates of plate filters are oriented in either the horizontal or vertical planes. While either vertical or horizontal plate filters may be used in the invention, horizontal plates are preferred for ease of operations. In the filter vessel, the commingled mixture contacts each of the filter plates so that a filtrate passes through a filter medium on each of the filters and is drawn off from the filter plates and removed from the filter vessel. At the same time, sludge residue solids are deposited on the filter medium and, over a period of time, a filter cake of solid residue builds up on the filter medium on each of the plates.

During the filtration process, a portion of the commingled mixture can be recycled back to the mixing tank. The amount of recycled mixture depends on a variety of factors, one of these being the maintaining of a sufficiently high liquid hourly space velocity in the filter vessel to minimize settling of solids to the bottom of the vessel and allowing solids distribution throughout the vessel for filtration.

The filtrate is charged to an oil/water separator for separation into an oily fraction and a water fraction. The oily fraction is routed to a refinery operating unit for conversion into useful, saleable products. The water fraction from the oil/water separator is diverted to the refinery oily water sewer, crude unit desalters, or sour water system for treatment and disposal in the usual manner.

Once the cake residue on the filter media on each of the horizontal filter plates is built up to a predetermined thickness, charge of the mixture of oily sludge/particulate filter aid/solvent to the filter vessel is discontinued and the remaining oily sludge/particulate filter aid and solvent is pumped back to the charge tank. A predetermined amount of solvent is then charged to the filter vessel to wash the accumulated filter cake residue and remove oily residue. After this solvent washing step, super-heated steam is introduced into the closed filter vessel to steam strip any remaining solvent and other volatile components from the washed filter cake residue. Depending upon the solvent used in the washing step, it may be necessary to reduce the filter vessel's pressure to a partial vacuum to facilitate stripping to a specific TPH level. Thus, when FCC naphtha is used and a TPH of 500 ppm is desired, vacuum conditions are usually necessary.

After the steam stripping process, the filter plates are rotated through about 90° in the case of horizontal filter plates, to a substantially vertical position, to dislodge filter cake from the filter medium. In the case of a vertical filter plate filter unit, the pressure across the plates is decreased until the cake separates from the plate. The dislodged filter cake then falls, by gravity, towards the lower region of the filter vessel which preferably contains cake breakers for breaking the cakes into smaller lumps or debris and preferably also a large scroll or screw for moving cake debris and expelling the cake debris from the filter vessel. During expulsion of the cake debris from the closed vessel, workers and the environment are not exposed to the hazardous components contained in the oily sludge, because said hazardous components have been extracted and stripped from the cake before it is expelled by the scroll into a conduit and then into containers for removal to a disposal site.

As explained before, the oily fraction of the sludge is extracted into a filtrate that is routed to a refinery operating unit for treatment to produce salable products. Typically, if the solvent was an FCCU product, then the filtrate is routed to an FCCU fractionator, preferably at slurry or heavy cycle oil return points to minimize impact on fractionator operational control. In the fractionator, the oily fraction is separated into fractions so that light fractions are distilled into FCC gasoline (for blending into gasolines), diesel range fractions distill with light cycle oil (for blending into diesel or other fuels), and heavier fractions distill into slurry oil. Alternatively, depending upon the solvent used and operational convenience in the particular refinery, the filtrate containing the oily fraction of the sludge could be charged to a heavy oil hydrocracker or hydrotreater for hydrogenation and cracking into shorter chain hydrocarbons that can be routed to the gasoline or diesel blending pools. As a further alternative, the filtrate may be charged to a coker or visbreaker to produce gasoline, diesel and bunker fuel oil fractions. As a yet further alternative, the oily fraction may be charged to a crude distillation unit for commingling with crude oil and distillation into fractions. Thus, the invention process is fully integrated with standard refinery operating units and produces salable end products from the oily fraction of the oily sludges.

DETAILED DESCRIPTION OF THE PREFERRED EMBODIMENTS

Figure 1:
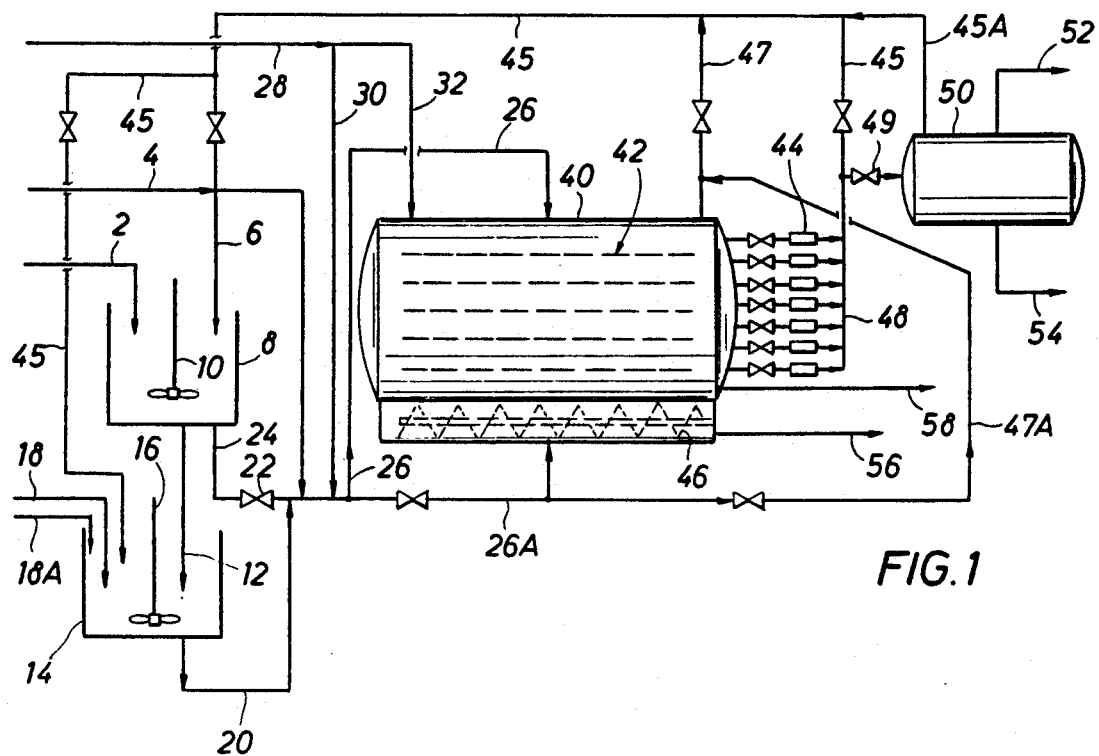
FIG. 1 is a simplified flow diagram of the invention integrated refinery oily sludge treatment process.

The invention provides a process for the treatment of refinery oily sludges that can be integrated into an oil refinery process scheme. The treatment process separates oily sludges into an oil fraction that is reprocessable in the oil refinery to produce saleable products and a solids residue portion that meets all federal and state regulatory requirements for disposal in non-hazardous solid waste landfills.

The term 'refinery oily sludge' refers to oily sludges generated in petroleum refinery operations that contain petroleum or hydrocarbon oils intermixed with particulate solids and water. These sludges usually contain a wide range of organic materials including those controlled under the EPA's TSLD requirements. The particulates are usually inorganic in nature and include corrosion products from pipelines and tanks, scale from pipelines in processing operations, dirt, clay, drilling residues, and the like. Among the common oily sludges are slop oil emulsion solids (SOES), API separator sludge, leaded and unleaded tank bottoms, and heat exchanger bundle cleaning sludge.

In the refinery oily sludge treatment process, the oily sludge is commingled with a solvent that is able to dissolve the oily fraction of the oily sludge. These solvents may be selected from oil refinery intermediate product streams from various refinery processing units and finished products, as long as the selected solvent stream is compatible with and can dissolve the oily portion of the oily sludge. While more than one of the refinery intermediate product streams and finished products may be used, the invention method may conveniently be practiced using only one as a solvent. The solvent should be substantially a liquid at the temperature and pressure conditions of the treatment process although some vaporization is not deleterious to the process. Solvent may be charged to the process at temperatures ranging from 25° F. up to 350° F., depending upon the treatment process pressure which can range from 20 to 1,500 psig, preferably 20 to 150 psig to minimize capital cost of pressure vessels while maintaining treatment efficiency. Preferably, the selected solvent has an initial boiling point in the range of 0 to about 300° F., a 50% boil-off in the range of 50 to about 350° F., and a 95% boil-off in the range 100 to about 500° F. Preferably, the solvent has an initial boiling point in the range 75° to about 150° F., a 50% boil-off in the range 200° to about 250° F., and a 95% boil-off in the range 350° to about 450° F. The solvent preferably contains at least about 10 wt. % aromatic components. The solvent contains at least about 10 wt. % aliphatic components. The most preferred solvents are naphtha and gasolines obtained from a fluid catalytic cracker, hydrocracker, or reformer. After the oily portion of the oily sludge has dissolved in the solvent, the solvent is returned to the oil refinery for further processing into a saleable product. Thus, the oil-bearing solvent may be routed to a crude distillation unit a heavy oil hydrocracker unit, a hydrotreater or a fluid catalytic cracking unit's fractionator column or reactor for further processing.

During the invention treatment process, the refinery oily sludge is mixed with a particulate filter aid. The useful filter aids are selected from those materials that do not degrade significantly when contacted with the oily portion of the sludge or the solvents. Further, the filter aids should not contain significant levels of materials listed by the U.S. EPA as hazardous. Examples of useful filter aids include inorganic material such as diatomaceous earth, vermiculite, perlite, pumice, sand, lime, gravel and the like; organic materials such as excelsior, sawdust, woodchips, straw, ground treebark, ground corncobs, deoiled rice husks, and the like; and synthetic polymeric materials such as porous polymeric (polypropylene) beads, blown plastic, and the like.

FIG. 1 is a simplified process flow diagram illustrating necessary process steps and major equipment of the invention process. In a first preferred optional step, particulate filter material is charged through conduit 2 to mixing vessel 8 supplied with an agitator 10 for premixing with a solvent charged through conduit 6 to the mixing tank. This premixing step allows the operator the flexibility of adjusting the ratio of particulate filter aid to solvent and permits the saturation of the particulate filter aid with solvent before it contacts oily sludge. For certain sludges, it may be desirable to water wet the filter aid or use a filter aid that is partially solvent wetted and partially water wetted. This may be useful when the sludge has a high water content and will then aid filtration.

The premixing step allows the operator to precoat filters used in the treatment process with filter aid and thereby enhance the separation of the oily sludge to solid and liquid portions. Thus, during the initial precoating step, the mixture of filter aid and solvent flows from the mixing tank 8 through conduit 24 and valve means 22 through conduit 26 or 26A and thence into filter vessel 40 which is supplied with a plurality of filter plates 42, shown in the horizontal position although, as explained before, vertical plate filters may also be used. Each of the horizontal filter plates 42 is supplied with a covering of a filter medium on its upper surface and a filtrate-receiving bottom tray beneath the filter medium for receiving filtrate from which filtrate may be withdrawn. Thus, during the precoating process, the particulate filter aid is deposited on the filter medium on the upper surface of the filter plate. The filter medium is typically a steel mesh screen of size depending upon the size of solids found in the particular oily sludges encountered and usually in the range from 120 to 400 mesh U.S. screen size. Filtrate is drawn through the filter medium into the filtrate-receiving bottom tray and then flows under pressure from filter vessel 40 to filtrate receiving conduits 44 and thence through conduit 45 for return to mixing tank 8. When the filter medium on filter plates 42 have been coated to a depth of from about 1/16 to about ¼ inches, the precoating step is discontinued and the filters in filter vessel 40 are ready to receive a charge of oily sludge for processing.

To prepare a charge of oily sludge for treatment, oily sludge is charged by conduit 18 to mixing tank 14 supplied with agitator 16 and is there intimately mixed with a mixture of filter aid and solvent supplied through conduit 12 from the filter aid-solvent mixing tank 8. Alternately, filter aid may be added directly to the mixing tank 14 through conduit 18A. The invention refinery oil sludge treatment process also includes a metal fixation step. This step is preferably carried out by adding a fixation chemical to immobilize metal or metal compounds present in the oily sludge to mixing tank 14 in a sufficient quantity to ensure substantial fixation of all metals. Alternatively, the metal fixation chemical may be added to the sludge cake produced by the process. Metal fixation chemicals are commercially available and include lime, silica or silicate-bearing solutions, fly ash, sodium sulfide, Pozzalime TM (product of Mineral Byproducts, Inc., containing about 60% calcium oxide and 16% silicon dioxide). These chemicals typically are blended with the oily sludge at levels of up to 100% by weight based on the weight of the solid fraction of the oily sludge, preferably from about 10 to about 50% by weight based on the weight of the solids in the sludge. The mixture of oily sludge/particulate filter aid/solvent with chemically fixed metal ions then flows from mixing tank 14 through conduits 20 and 26 (and/or 26A) for charging to the horizontal plate filter vessel 40.

The mixture of oily sludge/solvent/particulate filter aid flows through the filter vessel 40 at a liquid hourly space velocity sufficient to minimize the amount of particulates that would settle to the lower regions of the filter vessel 40 and sufficient to ensure that solids are distributed substantially throughout the interior of the filter vessel 40. To achieve this distribution, charge may enter from the top of the filter vessel 40 and be deflected via distributors located to obtain optimal distribution to each filter plate. Thus, the mixture will contact essentially each of the horizontal filter plates 42 to maximize the efficient usage of the available filter surface area. In the event that the liquid hourly space velocity is insufficient to achieve the desired distribution of solids within the filter vessel, and charge enters the filler at the base through conduit 26A, a portion of the mixture may be withdrawn through conduit 47 and routed to mixing tank 14 via conduit 45. On the other hand, if charge enters the filter from the top through conduit 26, then recycling may be effected using conduit 47A. This recycling effectively increases the liquid hourly space velocity through filter vessel 40 thereby enhancing the suspension of solids throughout the interior of the vessel.

The filter vessel 40 is maintained at a pressure sufficient to prevent significant volatilization of the charge, usually a pressure of from about 20 to about 250 psig, depending upon the solvent used and the sludge composition. The pressure drop across the filter plates is generally dependent on the type of filter medium, the level of cake build up, the viscosity of the filtrate, the fineness of sludge solids, and the like. Typically, pressure drops range from about 30 to about 150 psig. Further, the filter vessel 40 may be operated at ambient temperatures (about 70°-77° C.), but it is preferred that the vessel be operated at higher temperatures to facilitate filtration by lowering viscosities. Thus, preferably the vessel may be heated by steam, by means of a steam jacket, or otherwise to from 25° to 350° F. preferably from about 50° to about 200° F., depending upon the solvent used and the oily sludge being treated. The vessel's temperature should, preferably, not cause significant vaporization inside the vessel.

In the preferred embodiment, each of the horizontal filter plates are supplied with an individual filtrate draw-off conduit 44. These filtrate conduits 44 come together in a filtrate header 48 which charges the filtrate via conduit 49 to an oil/water separator 50 for separation into oil and water fractions. Oil from this separator is removed through conduit 52 for return to an oil refinery processing unit, such as a crude distillation unit, heavy oil hydrocracker, hydrotreater, coker, visbreaker, or a fluidized catalytic cracking unit, for ultimate processing into a finished saleable product. Water from the oil/water separator 50 is removed via conduit 54 and charged to the refinery wastewater treatment system, crude unit desalters, or sour water stripper.

As solid residue from the oily sludge accumulates on the filter medium on the upper surface of filter plates 42, a filter cake 41 is built up. As these filter cakes 41 grow in depth, they provide resistance to the flow of filtrate through the cake and filter medium thereby increasing the pressure drop required for liquid to pass from the interior of the filter vessel 40 into the filter pans beneath the filter plates 42. This results in a decline in the rate of filtrate production and provides a ready measure for determining when to cease filtration operations and remove the accumulated solid residue filter cake from the horizontal filter plates 42.

When the filter cakes 41 have reached a predetermined depth, or the filtration rate has fallen below a predetermined level, charge of the oily sludge/filter aid/solvent mixture to the filter vessel 40 is discontinued and the remaining oily sludge/ particulate filter aid and solvent is pumped back to the charge tank. A predetermined volume of solvent is then charged to filter vessel 40 through conduit 30 or 32 to wash the filter cake removing residual oil from the solid residue. The wash solvent is collected in the bottom trays of the filter plates 42 and is removed from the filter vessel via filtrate conduits 44 and filtrate header 48 for recycle to a refinery operating unit via the oil water separator 50, and conduit 52 as shown in FIG. 1 or for recycle to the solvent-filter aid mixing tank 8 via conduit 45A. Any water stripped from the filter cake is separated in the oil water separator 50 and removed via conduit 54 for disposal. The amount of solvent required to wash the filter cake is dependent upon several factors including the type of oily sludge being treated, the amount of residual oil estimated in the cake filter solid residue, and the amount of cake filter solid residue. However, the amount of solvent needed may be readily determined by bench scale experimentation. Typically, a solvent: cake solid residue ratio of from about 1 to about 40, preferably from about 3 to about 20, most preferably from about 6 to about 10 is necessary to achieve a filter cake residue that will meet the U.S. EPA TSLD requirements.

Once the filter cake residue has been washed with the predetermined amount of solvent, the remaining solvent is drained back to either tank 8 or 14. Steam is then charged to the filter vessel 40, which is preferably also equipped with a steam jacket supplied with steam. The amount and conditions of steam addition should be such as to steam strip substantially all remaining solvent and volatiles from the filter cake residue solid for removal through blow-down conduit 58 and filtrate-receiving conduits 44. Thus, steam at 250 psig may be let down to 60 psig and charged as super-heated steam to the filter vessel 40 for effective steam stripping. The duration of the steam stripping treatment, or the amount of steam needed, may be determined from bench scale experimentation. However, it has been found that for treating SOES steam stripping should be carried out for at least about 20 minutes, more preferably at least about 60 minutes, in order to produce a cake solid residue with a total petroleum hydrocarbon (TPH) content that meets state requirements for disposal in a non-hazardous solid waste landfill, i.e., less than about 500 ppm. Clearly, steam stripping time, rate and pressure may be adjusted to achieve the level of TPH specified by a particular state regulatory authority.

Figure 2A:
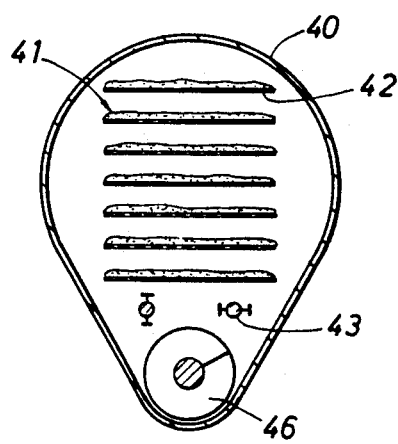
FIG. 2A is a schematic cross-sectional view of a horizontal plate filter useful in the invention process, with the horizontal plates in the horizontal position.
Figure 2B:
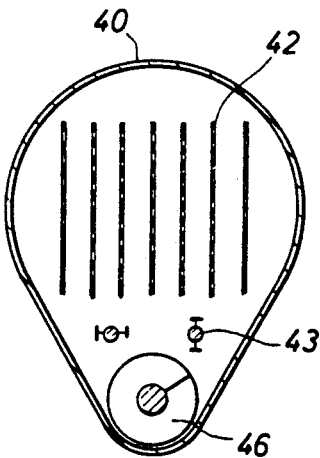
FIG. 2B is a schematic cross-sectional view of a horizontal plate filter of the type useful in the invention process, showing the filter plates in the vertical position.
Figure 2:
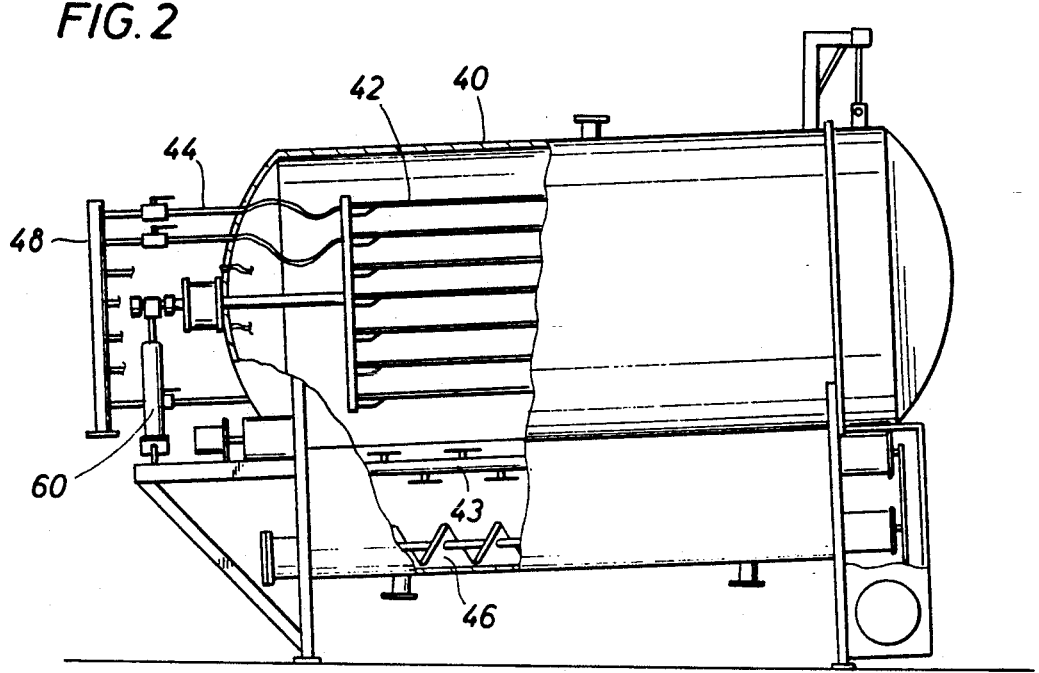
FIG. 2 is a side view, in partial cross section, showing details of a horizontal plate filter useful in the present invention.
Figure 3:
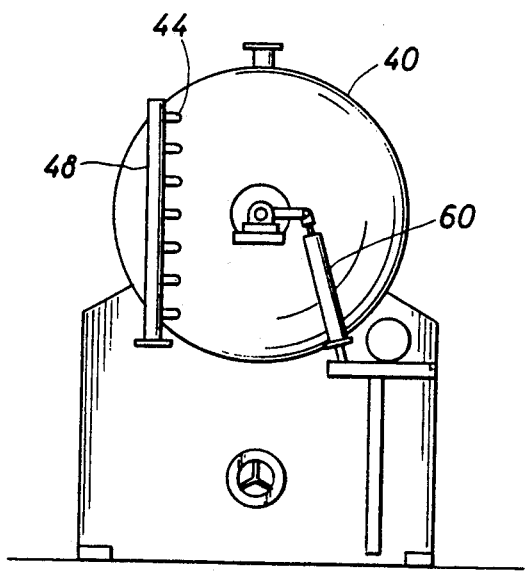
FIG. 3 is an end view of the horizontal plate filter of FIG. 2.
Figure 4:
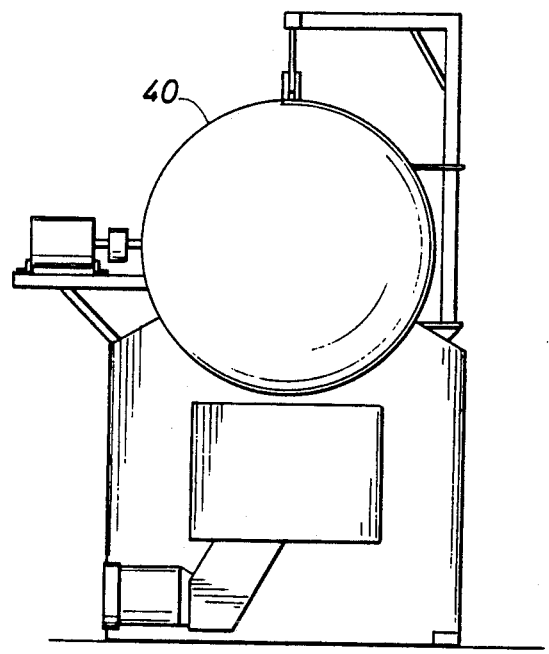
FIG. 4 is the other end view of the horizontal plate filter of FIG. 2.

After the filter cake residues have been solvent washed and steam stripped, the solid residues must be removed from the filter vessel 40 for disposal. To effect this removal, in the case of horizontal plate filter, the filter plates may be rotated through about 90° until they are substantially vertical, as shown schematically in FIG. 2B. This may be effected without opening the filter vessel 40 by utilizing a means for rotation 60 fitted to the preferred horizontal plate filter useful in the present invention. In the case of a vertical plate filter, the pressure drop across the filter plates is reduced until the cakes dislodge from the plates.

Once the filter plates 42 are in a substantially vertical position, the filter cakes 41 dislodge from the vertical plates and fall by gravity onto rotating cake breakers 43 that break the large cakes into smaller pieces of cake debris. The dislodging of the cakes 41 may be assisted by means for shaking or vibrating 62 the filter plates 42. The cake debris then falls by gravity to the base of the filter vessel which is preferably equipped with a scroll conveyor 46. This rotating scroll moves the cake debris towards the exit end of the filter vessel 40 and expels the cake debris through conduit 56 into containers for disposal of the cake debris or solid residue. If the vessel 40 is not equipped with a scroll conveyor, then the vessel must be opened and the cake residue debris removed. In this event, the steam stripping will have removed volatile hydrocarbons so that the filter vessel's interior and the cake residue will pose no hazard to labor or the environment.

The cake residue from the invention process for treatment of oily sludges meets the U.S. EPA BDAT requirement and may therefore be disposed in hazardous waste landfills. Such disposal leads to significant cost savings as compared to disposal by incineration. The solid residue produced furthermore qualifies for delisting under the U.S. EPA guidelines and meets the TCLP requirement so that it may be classified as 'non-hazardous' and suitable for disposal in non-hazardous solid waste landfills, if state requirements for such disposal are met. The cake residues from the invention treatment process contain less than about 1,000 parts per million (ppm) total petroleum hydrocarbon, preferably less than about 500 ppm total petroleum hydrocarbon, as measured by a modified method EPA SW 846-8015 (Non-halogenated Volatile Organics), and therefore meet the requirements of certain states for disposal in non-hazardous solid waste landfills. For example, the State of Oklahoma currently requires that total petroleum hydrocarbon content be less than 1,000 ppm.

The following examples are intended to illustrate the invention and do not limit the scope of the invention as described above and claimed hereafter.

EXAMPLES

A pilot scale sludge treatment unit was developed and used at the Wynnewood Refinery of Kerr-McGee Corporation, at Wynnewood, Okla., to demonstrate the invention technology. The process flow of this pilot plant corresponds substantially to the flow diagram of FIG. 1.

A series of 13 runs were performed to determine the effect of process variables on sludge treatment rates and the properties of the resultant filter residue cakes. During these runs, a sample of 'slop oil emulsion solids' (SOES) was removed from a refinery tank and mixed with solvent and a filter aid, perlite, in a stirred tank. The mixture of solvent and filter aid was then filtered to produce a solid cake residue and a filtrate containing oil and water. The filtrate was separated into oil and water fractions. The oil was recycled to a refinery oil processing unit. In runs 1-3, the filter aid was water wetted and, in runs 4-13, the filter aid was solvent wetted before mixing with SOES. The SOES-filter aid mixture was then pumped to a Sparkler TM filter (manufactured by Sparkler Filters, Inc. of Conroe, Tex., Model No. HRC-10, 10 sq. ft. filter area), containing 5 horizontal filter plates, under sufficient pressure (about 60 psig) to provide a 50 psig typical pressure drop across the filter plates. To increase solubility of water in the solvent, filter vessel temperature was maintained at about 200° F. by steam supplied to a steam jacket around the filter vessel. Experience gained during these pilot plant runs led to a preference for charging the filter aid-SOES mix to the base of the filter vessel and removing a portion of the mix from a location at the top of the vessel. This withdrawn portion (about 80-95% of the charge) was then recirculated back to the stirred tank in which the SOES and filter aid was mixed. Without this recirculation, solids sometimes tended to accumulate preferentially on the lowest horizontal beds in the filter vessel and little solids were carried to the uppermost beds. As an alternative, feed could be charged to the top of the filter vessel with liquid distributors located inside the vessel to deflect the feed evenly to the filter plates.

When a sufficient amount of SOES-filter aid mix had been deposited on the horizontal filter plates, charging of this mixture to the filter vessel was stopped and the filter cake residue on the plates was washed with a quantity of solvent. Since each filter plate of the Sparkler TM filter is an independent filter capable of being washed with solvent and discharging a filtrate, it was possible to monitor the quality of filtrate from each bed. The Sparkler TM filter used was fitted with a steam jacket which was also activated during the filtration and solvent washing stages.

After solvent washing the filter cake residue, 225 psig saturated steam was let down to 60 psig and charged to the filter vessel for a measured amount of time. During this cake steaming process, condensate that accumulated in the bottom of the filter vessel was intermittently blown down.

After the cake had been steamed for a measured amount of time, the pressure vessel was on some of the runs air purged for a measured amount of time at 10 to 30 psig to dry the filter cake. The filter plates were then rotated 90° and the cake was dumped into the bottom of the filter shell where rotating cake breakers and an auger inside the filter vessel were used to expel the filter cake from the cake outlet flange without opening the filter vessel itself.

For runs 1-3, the filter aid was water-wetted before mixing SOES and being charged to the filter vessel. It was found that this water-wetting led to high hydrocarbon content filter residue cakes so that this method was not pursued further.

For runs 4-13, the filter aid was prewetted with a solvent that is produced at the oil refinery. More specifically, for runs 4-7, the solvent was a heavy unicrackate (HUK) gasoline fraction produced at the refinery; for runs 8-9, the solvent was a fluidized catalytic cracker gasoline produced at the refinery. For runs 10-12, the solvent was FCC gasoline but the wash solvent was FCC naphtha.

For runs 4-8, the horizontal filters in the filter vessel were not precoated with a mixture of filter and solvent. However, in run 9, the horizontal filter plates were precoated before the charge of SOES and filter aid was pumped to the filter vessel. The filter precoat consisted of about ⅛th inch thickness of filter aid deposited on the filter plate by filtering a mixture of FCC gasoline and perlite grade H-R through the filter. Samples of filtrate were taken during this run of the first gallon of filtrate, the 28th gallon and at end of run. The oil, water and solids content of these filtrates were measured and are recorded in Table 5.

Table 1 summarizes the conditions of runs 4-9 and shows a range of 'solvent to cake' ratios tested ranging from 14 to 54. This is the ratio between the amount of wash solvent used and the cake volume. Even the lowest solvent to cake ratio produced a cake residue meeting EPA Land Disposal Restriction Requirements (40 CFR §268) as can be seen from the analysis of cake residues in Tables 3A and 3B. (For run 8, samples of residue were taken from filter plate 3 (Bed 3), the bottom plate (8B), the middle plate (8M), and the top plate (8T). Likewise, for run 9, samples were taken from the top plate (9T), the second plate (9-2), the third plate (9-3), the fourth plate (9-4), and the bottom plate (9-B).) Further, the residues from runs 4 and 8, and four out of the five residues from run 9 meet the Oklahoma's requirement of less than 1,000 ppm hydrocarbon for disposal in a non-hazardous solid waste landfill. No other samples were tested for TPH. similar to: "Proposed Modified EPA Method 8015" of the U.S. Army Corp. of Engineers (CENPD-EN-G-L) (1989); "Draft Method for Petroleum Hydrocarbons and Total Organic Lead" from the Hazardous Material Laboratory, California Department of Health Services (Feb. 1988); and 'Problems Associated With Analysis of Petroleum-Derived Materials in the Environment,' by Knapp et al. of the Organic Analysis Section, University Hygienic Laboratory, University of Iowa (Aug. 1988). In the method, residue matrices are prepared for analysis by extracting a sample of the material with methylene chloride. The extract is filtered and concentrated for analysis by gas chromatography.

In each run, the steam purge time was about 60 minutes while the air purge time ranged from 0 to 45 minutes. Air purging was found to dry the cake residue. Run 4, in particular, produced a very dry cake that was a dusty powder. Air purging may not be necessary since a cake with 10-20% water can be produced without air purging. Such a cake residue is not dusty and is easier to handle.

For run 9 more specific data were obtained by measuring cake volume on each filter plate (numbered from top to bottom as 1-5) and also measuring the volume of solvent used to wash each cake. Thus, the solvent:cake ratio ranged from about 4 to about 20.

From Table 3 it can be seen that if sludge cake residue is not solvent washed and steamed the cake water content is about 42%. This is relatively high and results in a high cost of disposal. Steam purging is mainly intended to strip hydrocarbons from the cake residue but also appears to aid in the removal of water thereby reducing cake moisture content.

From Table 4 it can be seen that the oil content of the filtrate decreases as filtration proceeds and cake depth builds. However, filtration rate also declines as cake depth builds due to increasing pressure drop across the cake thickness. Table 6 shows the variation of filtration rate with time for run 9. The 5 gallon samples were taken sequentially with substantially no interval between samples.

Table 5 shows the results of reactive cyanide and total cyanide analyses on filter cake residue of runs 4-8. All residues meet EPA land disposal requirements.

The oil/water filtrates obtained during the pilot plant runs were separated into an oil fraction and a water fraction. The oil fraction was returned to the oil refinery for further processing into commercially useful products while the water fraction was routed to the refinery waste water treatment system.

TABLE 1

| Summary of Process Variables For Runs 4-8 | | | | | | |
|---|---|---|---|---|---|---|
| Run Number | 4 | 5 | 6 | 7 | 8 | 9 |
| Solvent Type | HUK | HUK | HUK | HUK | FCC | FCC |
| Gallons of Solvent | 180 | 190 | 340 | 300 | 190 | 156 |
| Cake, gallons | 4.9 | 7.0 | 10.5 | 5.5 | 6.0 | 11.2 |
| Solvent to Cake Ratio | 37 | 27 | 32 | 54 | 32 | 4-20 |
| Steam time, Min. | 60 | 60 | 60 | 30 | 60 | 60 |
| Air Purge, Min. | 45 | 35 | 30 | 20 | 0 | 0 |

TABLE 2

| Summary of Process Variables for Run 9 | | | | | |
|---|---|---|---|---|---|
| Filter Plate No. | 1 | 2 | 3 | 4 | 5 |
| Gallons of Solvent | 9 | 19 | 31 | 38 | 36 |
| Cake, Gallons | 2.3 | 2.4 | 2.6 | 2.4 | 1.8 |
| Solvent to Cake Ratio | 4 | 8 | 12 | 16 | 20 |

TABLE 3

Effect of Air Purge on Water Content of SOES Filter Cake Residue

| Sample | | Water Content Wt. % | Air Purge, Minutes |
|---|---|---|---|
| Filtered sludge cake residue (no solvent wash or steaming) | | 42.1 | 0 |
| Run 4, | top bed | 0.53 | 45 |
| Run 4, | middle bed | 2.97 | 45 |
| Run 4, | bottom bed | 11.8 | 45 |
| Run 4, | composite | 4.13 | 45 |
| Run 5, | top bed | 5.14 | 35 |
| Run 5, | middle bed | 7.52 | 35 |
| Run 5, | bottom bed | 10.3 | 35 |
| Run 6 | | Not Done | 30 |
| Run 7, | middle bed | 10.8 | 20 |
| Run 7, | composite | 10.6 | 20 |
| Run 8, | top bed | 16.2 | 0 |
| Run 8, | middle bed | 11.5 | 0 |
| Run 8, | bottom bed | 8.1 | 0 |
| Run 8, | composite | 7.7 | 0 |
| Run 9, | top bed | 20 | 0 |
| | second bed | 19 | 0 |
| | third bed | 18 | 0 |
| | fourth bed | 16 | 0 |
| | bottom bed | 16 | 0 |

TABLE 4

| Oil/Water Content of Filtrates from Run 9 | | | |
|---|---|---|---|
| | Oil Vol. % | Water Vol. % | Solids % |
| First Gallon | 55 | 45 | <0.1 |
| 28th Gallon | 50 | 50 | 0.0 |

TABLE 4-continued

| Oil/Water Content of Filtrates from Run 9 | | | |
|---|---|---|---|
| | Oil Vol. % | Water Vol. % | Solids % |
| Last Gallon | 40 | 60 | <0.1 |

TABLE 5

| Reactive Cyanide, Sulfides and Total Cyanides For Runs 4-8 | | | |
|---|---|---|---|
| Sample Number | Reactive Sulfide mg/kg | Reactive Cyanide mg/kg | Total Cyanide mg/kg |
| 4 | 12.8 | <1.0 | 0.7 |
| 5 | 17.6 | <1.0 | 0.6 |
| 6 | 16 | <1.0 | 0.7 |
| 7 | 1.4 | <1.0 | 0.8 |
| 8 | 17.6 | <1.0 | <0.5 |
| EPA Land Disposal Restriction Limits | 500 | 250 | — |
| BDAT Limits | — | — | 1.8 |

Note: Reactive Cyanide and Sulfide was determined by Southwest Laboratory of Oklahoma per EPA methodology, SW846, Third edition, November 1986. Reactive sulfides were done per SW 7.3.4.2, reactive cyanides per SW 7.3.3.2. Detection limits for both tests were 1.0 mg/kg.

TABLE 6

| Variation of Filtration Rate with Time for Run 9 | | | | | | | |
|---|---|---|---|---|---|---|---|
| Time to collect successive 5-gallon catches of filtrate, mins. | 4 | 8 | 12 | 17 | 19 | 20 | 30 |

Although the invention has been described with reference to its preferred embodiments, those of ordinary skill in the art may, upon reading this disclosure, appreciate changes and modifications which do not depart from the scope and spirit of the invention as described above or claimed hereafter.

We claim:

1. An integrated method for the treatment of refinery oily sludge with refinery generated solvent to remove oil from the sludge for recycling to said refinery and produce a sludge cake residue from sludge solids that is sufficiently free of petroleum hydrocarbons oil to qualify for landfill disposal, the method comprising the steps of:

mixing refinery oily sludge with a particulate filter said in a vessel to produce a filter charge;

introducing said filter charge into a closed filter vessel containing a plurality of filter plates, said plates each having a mesh filter medium covering on an upper surface and a filtrate-receiving bottom tray beneath the filter medium for receiving filtrate and from which filtrate is withdrawn;

charging a solvent from said refinery into said closed filter vessel substantially simultaneously with the entry of said filter charge into said closed filter vessel, said solvent commingling with said filter charge entering said closed filter vessel;

contacting said filter charge commingled with said solvent with said plurality of filter plates to filter out onto the upper surface of said plates a solid residue in the form of filter cake and to produce a filtrate of a mixture of oil, water and solvent;

collecting said filtrate of oil, water, and solvent in the filtrate-receiving bottom trays beneath the filter media of the filter plates;

directing said collected oil, water and solvent mixture out of said closed filter vessel in filtrate headers extending from the filtrate-receiving bottom trays and thereafter separating said water from said mixture and recycling remaining oil and solvent of the mixture to said refinery for further processing;

continuing said contacting to filter a solid residue filter cake until the filter cake builds to a predetermined depth on the upper surfaces of the filter plates, then discontinuing said introducing of filter charge and charging of solvent;

washing the predetermined depth of solid residue filter cake on the upper surfaces of the filter plates with a predetermined quantity of solvent;

stripping the solid residue filter cake on the upper surfaces of the filter plates of hydrocarbons to a desired level of residual total petroleum hydrocarbons;

separating the stripped filter cake residue from said filter plates and causing the filter cake residue to fall by gravity onto a base of the closed filter vessel, said base containing a means for expelling filter cake residue from the filter vessel; and expelling said filter cake reside from said base of said filter vessel, without exposing surrounding environment to potentially hazardous levels of petroleum hydrocarbons originally contained in the refinery oil sludge, and containerizing the removed filter cake residue for disposal at an environmentally approved landfill.

2. The method set forth in claim 1, wherein said refinery solvent is selected from the group consisting of gasoline from a fluidized catalytic cracker, naphtha from a fluidized catalytic cracker, gasoline from a hydrocracker and gasoline from a reformer.

3. The method set forth in claim 1 further comprising adding a composition to fix heavy metal ions in the oily sludge before introducing the filter charge to the filter vessel.

4. The method of claim 1 wherein the filter plates of the filter vessel are horizontal during the contacting to filter out solid residue.

5. The method set forth in claim 1, wherein said filter plates are precoated with a particulate filter aid prior to introducing said filter charge into said closed filter vessel.

6. The method set forth in claim 1 wherein the particulate filter aid is selected from the group consisting of diatomaceous earth, vermiculite, wood chips, lime, sand, perlite, and polymeric beads.

7. The method set forth in claim 1 wherein the removing includes discharging, by means of a screw conveyor, a filter cake residue having a total petroleum hydrocarbon content of less than 1000 ppm.

8. The method of claim 7 wherein the total petroleum hydrocarbon content is less than about 500 ppm.

9. The method of claim 1 wherein the removing includes removing a filter cake residue having a total petroleum hydrocarbon content of less than 1,000 ppm.

10. The method of claim 1 wherein the removing includes removing a filter cake residue having a total petroleum hydrocarbon content of less than 500 ppm.

11. The method of claim 1 wherein the step of recycling filtrate for further processing includes charging to a refinery processing unit selected from the group consisting of a fluidized catalytic cracker fractionator, a crude oil distillation column, a heavy oil hydrocracker, a hydrotreater, a visbreaker and a coker.

12. The method of claim 1 wherein the filter vessel is maintained at a temperature in the range from about 25° to about 350° F. and a pressure in the range from about 20 to about 250 psig.

13. The method of claim 1, further comprising adding a heavy metals fixation chemical to the filter cake residue.

14. An integrated method for the treatment of refinery oily sludge with refinery generated solvents to remove oil from the sludge for recycling to said refinery and produce a sludge cake residue from sludge solids that is sufficiently free of petroleum hydrocarbons to qualify for landfill disposal, the method comprising the steps of:

precoating a plurality of filter plates contained in a filter vessel with a particulate filter.

mixing refinery oily sludge with a particulate filter aid in a vessel to produce a filter charge;

introducing said filter charge into the filter vessel containing a plurality of filter plates, said plates each having a mesh filter medium covering on an upper surface and a filtrate-receiving bottom tray beneath the filter medium for receiving filtrate and from which filtrate is withdrawn;

charging a single solvent selected from the group consisting of gasoline from a fluidized catalytic cracker, naphtha from a fluidized catalytic cracker, gasoline from a hydrocracker, and gasoline from a reformer, into said filter vessel substantially simultaneously with the entry of said filter charge into said filter vessel, said solvent commingling with said filter charge entering said filter vessel;

maintaining said filter vessel at a temperature from about 25° F. to about 350° F. to facilitate filtration;

contacting said filter charge commingled with said solvent with said plurality of filter plates while maintaining a pressure drop of about 30 to about 150 psi across the filter plates to filter out onto the upper surface of said plates a solid residue in the form of a filter cake and to produce a filtrate of a mixture of oil, water and solvent;

collecting said filtrate of oil, water, and solvent in the filtrate-receiving bottom trays beneath the filter media of the filter plates;

directing said collected filtrate out of said filter vessel in filtrate headers extending from the filtrate-receiving bottom trays, separating said water from said filtrate and recycling remaining oil and solvent to a refinery unit, selected from the group consisting of a fluidized catalytic cracker fractionator, a crude oil distillation unit, a heavy oil hydrocracker, a hydrotreater, a visbreaker and a coker, for further processing;

continuing said contacting to filter a solid residue filter cake until the filter cake builds to a predetermined depth on the upper surfaces of the filter plates, then discontinuing said introducing of filter charge and charging of solvent;

washing the predetermined depth of solid residue filter cake on the upper surfaces of the filter plates with a predetermined quantity of a solvent;

steam stripping the solid residue filter cake on the upper surfaces of the filter plates to remove hydrocarbons to achieve a residual level of total petroleum hydrocarbons of less than about 1,000 ppm in the filter cake residue;

separating the steam stripped filter cake residue from said filter plates and causing the filter cake residue to fall by gravity onto a base of the filter vessel, said base containing a means for expelling filter cake residue from the filter vessel; and expelling filter cake residue from the base of said filter vessel, without exposing surrounding environment to potentially hazardous levels of petroleum hydrocarbons in said filter vessel, and containerizing the removed filter cake residue for disposal at an environmentally approved landfill.

15. The method of claim 14 wherein the steam stripping of the solid residue filter cake reduces total petroleum hydrocarbons to less than about 500 ppm.

16. The method of claim 14 wherein said removing of filter cake residue includes discharging filter cake from the filter vessel by means of a screw conveyor.

* * * * *